Oct. 7, 1947.  C. M. THACKER  2,428,727
CARBON DISULFIDE PROCESS
Filed Dec. 26, 1942
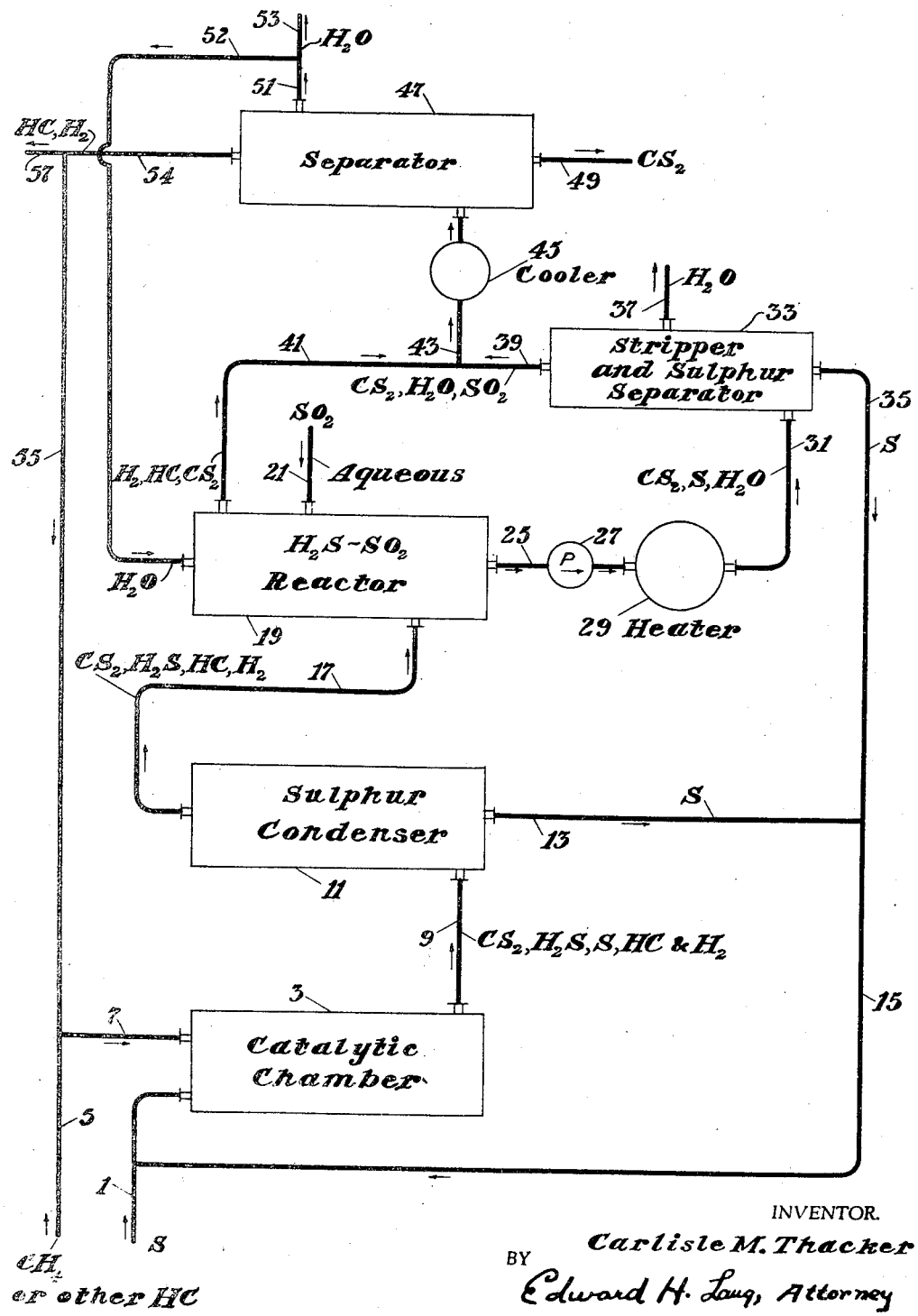
INVENTOR.
Carlisle M. Thacker
BY
Edward H. Laug, Attorney Patented Oct. 7, 1947

2,428,727

UNITED STATES PATENT OFFICE 2,428,727

CARBON DISULFIDE PROCESS

Carlisle M. Thacker, Highland Park, Ill., assignor to The Pure Oil Company, Chicago, Ill., a corporation of Ohio Application December 26, 1942, Serial No. 470,303

2 Claims. (Cl. 23—206)

This invention relates to a preparation of carbon disulfide from hydrocarbons and is more particularly concerned with a continuous process involving recovery of sulfur from the effluent products of the process and recycling of the recovered sulfur to the process.

In my application, Serial No. 294,319, filed September 11, 1939, now U. S. Patent No. 2,330,934, issued October 5, 1943, there is disclosed and claimed a process for preparing carbon disulfide from hydrocarbons, such as methane, by reacting the hydrocarbons with sulfur at temperatures of 450–750° C. in the presence of a catalyst selected from the group consisting of silica gel, fuller's earth, bauxite, activated alumina, and in general those types of clay which have been found effective in the removal of color producing and gum forming constituents in petroleum oils. These catalysts may be used alone or together with one or more metal compounds of metals of groups V, VI, VII and VIII of the periodic table. Oxides or sulfides of the aforementioned metals are useful as catalyst promoters. As examples of metal compounds which may be used as promoters in conjunction with the silica gel, fuller's earth, activated alumina or bauxite or the oxides or sulfides of iron, vanadium, chromium, molybdenum and manganese. Space velocities of 400 to 10,000 volumes of gas per hour or even higher space velocities may be used. By space velocity is meant the ratio of total volume of gases at 0° C. and 760 mm. pressure passed over the catalyst per hour to the volume of the space occupied by the catalyst. Under the conditions outlined, over 90% by weight of the methane or other hydrocarbons charged can be converted into carbon disulfide in one passage through the catalyst bed.

The reaction proceeds in accordance with the following equation:

$$CH_4 + xS_y = CS_2 + 2H_2S$$

In order to make this process competitive with present commercial processes for making carbon disulfide, it is either necessary to recover sulfur from the hydrogen sulfide formed or to have a profitable means of disposal or use for the hydrogen sulfide.

An object of the invention is to prepare carbon disulfide from hydrocarbons and sulfur.

Another object of the invention is to provide a method for recovering carbon disulfide and sulfur from gases and vapors containing substantial amounts of carbon disulfide and hydrogen sulfide.

A further object of the invention is to provide an economical process for converting hydrocarbons into carbon disulfide at relatively low temperatures.

Other objects and advantages of the invention will become apparent from the following description and accompanying drawing of which the single figure is a schematic flow diagram showing the various steps in the process.

In accordance with my invention the gases leaving the carbon disulfide reaction chamber are cooled sufficiently to condense unreacted sulfur, which is separated from the remaining vapors and recycled to the catalytic chamber. The remaining products of the reaction consisting primarily of carbon disulfide, hydrogen sulfide, unreacted hydrocarbons, and a small amount of hydrogen are passed to a reactor wherein they are contacted with an aqueous solution of sulfur dioxide. The hydrogen sulfide and sulfur dioxide react in the presence of water to form sulfur and water in accordance with the following reaction: $2H_2S + SO_2 = 3S + 2H_2O$. The carbon disulfide does not appreciably react and therefore is readily separated from the aqueous phase of the reaction mixture, together with hydrocarbons and hydrogen and can be readily fractionated from the mixture to form a substantially pure product.

In order to better understand my invention reference should be made to accompanying drawing. The drawing should be read with the longer right side thereof considered as the bottom. Numeral 1 indicates a line through which sulfur is charged to the catalytic reaction chamber 3. The sulfur may either be in molten or vapor form, depending on the temperature and pressure maintained in the catalyst chamber. Although I prefer to operate at atmospheric pressure, super-atmospheric pressures may be used. As catalyst, I prefer to use an activated form of bauxite, although I may use any of the catalysts previously disclosed, as well as sulfides of the metals of the 8th group of the periodic system, preferably supported on a catalyst carrier such as diatomaceous earth, pumice or bauxite with or without a promoter, such as thorium oxide, chromium oxide or cerium oxide. Methane or other hydrocarbons, such as ethane, propane, butane, ethylene, propylene or butylene, as well as mixtures thereof, or even higher boiling hydrocarbons, may be charged to the catalytic chamber through lines 5 and 7. Both the hydrocarbon and the sulfur are preferably heated to approximately reaction temperature prior to charging them to the catalytic chamber.

The temperature of the catalyst is maintained within the range of 450–750° C., and preferably within the range of 450–700° C., although higher temperatures may be used. The process is applicable to any process for preparing carbon disulfide from sulfur and hydrocarbons wherein a substantial amount of hydrogen sulfide is formed as one of the reaction products.

In the catalytic chamber 3 the sulfur and hydrocarbon react to form primarily carbon disulfide and hydrogen sulfide together with some hydrogen. When operating with a stoichiometric ratio of sulfur to methane or a slightly higher sulfur-methane ratio, the amount of hydrogen formed will depend chiefly on the temperature of reaction, it being very small within the preferred temperature range and increasing as the temperature increases above the preferred range.

The reaction products, including unreacted sulfur and hydrocarbon, leave the catalyst chamber through line 9 and pass to sulfur condenser 11 wherein the temperature is lowered to a temperature well below the boiling point of sulfur but not below the boiling point of carbon disulfide. The temperature in the sulfur condenser will preferably be about 120–130° C. The temperature within the sulfur condenser should preferably be adjusted to keep the sulfur in mobile liquid phase so that it may be easily recycled through lines 13 and 15 to the catalytic chamber 3. The carbon disulfide, hydrogen sulfide, unreacted hydrocarbons, and hydrogen leave the sulfur condenser as a gas-vapor mixture through line 17 and pass to a hydrogen sulfide-sulfur dioxide reactor 19, in which the vapors contact an aqueous solution of sulfur dioxide. An aqueous sulfur dioxide solution or a mixture of a saturated aqueous sulfur dioxide solution and sulfur dioxide gas may be fed to the reactor through line 21. The contact between the reaction vapors and the aqueous sulfur dioxide is preferably countercurrent. In the hydrogen sulfide-sulfur dioxide reactor, hydrogen sulfide reacts with the sulfur dioxide to form sulfur and water. If the temperature of the hydrogen sulfide-sulfur dioxide reactor is maintained below the melting point of sulfur, the sulfur will precipitate in the water as a colloid. If, however, the system is carried under super atmospheric pressure, sufficiently high to keep the water in the liquid phase at the melting point of sulfur, the sulfur will agglomerate and form a liquid body at the bottom of the reactor. The reactor 19 may be maintained at a temperature from atmospheric to approximately 130° C. The process can be carried out by feeding to reactor 19 a stoichiometric ratio of sulfur dioxide to hydrogen sulfide or by feeding sulfur dioxide in an amount lower than or in excess of the stoichiometric ratio. It is preferred, however, to maintain the sulfur dioxide-hydrogen sulfide ratio at or very near the stoichiometric ratio required for production of sulfur and water.

A satisfactory method of separation is to feed an excess of sulfur dioxide and to maintain reactor 19 at substantially atmospheric pressure and at a temperature below 100° C. so that the water will remain in liquid phase and hold the sulfur in colloidal suspension. The water, containing the suspended sulfur, is withdrawn from the bottom of the reactor through line 25 and pump 27 wherein the pressure is raised to at least 25 pounds per square inch gauge. The water suspension of sulfur is then heated in heater 29 to a temperature of approximately 130° C. and charged through line 31 into stripper 33. At the temperature and pressure conditions outlined, the sulfur melts and agglomerates into a liquid which separates in the bottom of tower 33 from which it is recycled through lines 35 and 15 to the catalytic chamber 3. Under these conditions of temperature and pressure, the water can be withdrawn as liquid from an intermediate portion of the stripper through line 37. This water may be recycled to an absorber (not shown) for preparing aqueous sulfur dioxide for charging to reactor 19.

The aqueous phase withdrawn from reactor 19 may contain a small amount of carbon disulfide and sulfur dioxide which are vaporized in stripper 33.

The carbon disulfide vapors together with a small amount of water vapor and sulfur dioxide pass from the top of the stripper through line 39 and join the hydrogen-carbon disulfide-hydrocarbon vapor leaving the top of reactor 19 through line 41. The combined vapors pass through line 43 and cooler 45 into separator 47. In the cooler 45 the temperature is reduced sufficiently to condense carbon disulfide, which is withdrawn from the bottom thereof as liquid through line 49. This crude carbon disulfide can be purified by distillation. Any sulfur dioxide recovered in this distillation can be recycled to reactor 19 through line 21 or can be absorbed in water from stripper 37 and/or separator 47 prior to returning it to the reactor. Any water contained in the vapors is likewise condensed and may be withdrawn from an intermediate portion of the separator 47 through line 51. This water will contain therein a portion of sulfur dioxide contained in the vapors, and may be recycled through line 52 to the upper portion of the reactor 19. All or a portion of this water may be withdrawn through line 53 and used in preparation of aqueous sulfur dioxide solution for charging to reactor 19 through line 21. The remaining gases consisting chiefly of unreacted hydrocarbons and possibly hydrogen is withdrawn from the separator through line 54 and recycled through lines 55 and 7 to the catalytic chamber 3, or withdrawn from the system through line 57. If desired, a portion of the gas may be recycled and a portion eliminated from the system. The disposal of the gas leaving line 57 will depend somewhat upon the available gas supply and the amount of sulfur compounds contained therein. Where the supply of methane or other hydrocarbon is ample and constitutes a waste product and where the sulfur content of the gas is sufficiently low it may be desirable to eliminate the gases leaving separator 47 through line 57 from the system and utilize them as fuel or for other purposes.

In the event the sulfur dioxide fed to reactor 19 is insufficient to react with all the hydrogen sulfide in the reaction products, it may be desirable to recycle water from separator 47 to reactor 19, recycle gases leaving separator 47 to catalytic chamber 3, and recycle gas separated from the carbon disulfide liquid, withdrawn from separator 47, to catalytic chamber 3, in order to recover hydrogen sulfide from these products and to convert other sulfur compounds such as mercaptans, which may be contained in the carbon disulfide to carbon disulfide.

I claim:

1. The process of preparing carbon disulfide comprising contacting hydrocarbons and sulfur in a conversion zone under conditions such as to yield carbon disulfide and hydrogen sulfide as the chief reaction products, cooling the reaction products sufficiently to condense molten unreacted sulfur, separating the molten sulfur from the reaction products and recycling it to the conversion zone, contacting the remaining reaction products comprising chiefly carbon disulfide and hydrogen sulfide with water and sulfur dioxide at a temperature below 100° C. in order to form sulfur, the amount of sulfur dioxide being approximately the stoichiometric equivalent of the hydrogen sulfide and the water being less than the amount required to give a saturated solution of sulfur dioxide, separating suspended sulfur from the aqueous medium and recycling the sulfur to the conversion zone, separating carbon disulfide from the aqueous medium and from the remaining reaction products and collecting the same, recovering excess sulfur dioxide from the reaction gases in a portion of the aqueous medium from which sulfur has been separated and recycling aqueous medium containing dissolved sulfur dioxide to the sulfur forming step.

2. Process in accordance with claim 1 in which the aqueous medium containing suspended sulfur is heated under pressure to a temperature sufficient to melt sulfur but below the boiling point of water and the sulfur is recycled to the conversion zone in molten state.

CARLISLE M. THACKER.

REFERENCES CITED

The following references are of record in the file of this patent:

UNITED STATES PATENTS

| Number | Name | Date |
|---|---|---|
| 2,187,393 | Simo | Jan. 16, 1940 |
| 1,765,809 | Vogel | June 24, 1930 |
| 1,907,274 | Wheeler | May 2, 1933 |
| 2,021,865 | Lincoln | Nov. 19, 1935 |
| 2,330,934 | Thacker | Oct. 5, 1943 |

OTHER REFERENCES

Mellor, "Comprehensive Treatise on Inorganic and Theoretical Chemistry," vol. 10, 1930, page 134, Longmans, Green & Co., London, England.